Aug. 25, 1953     E. V. BENNETT ET AL     2,649,869
APPARATUS FOR MAKING WOOD PATCHES
Filed Aug. 29, 1950     5 Sheets-Sheet 2
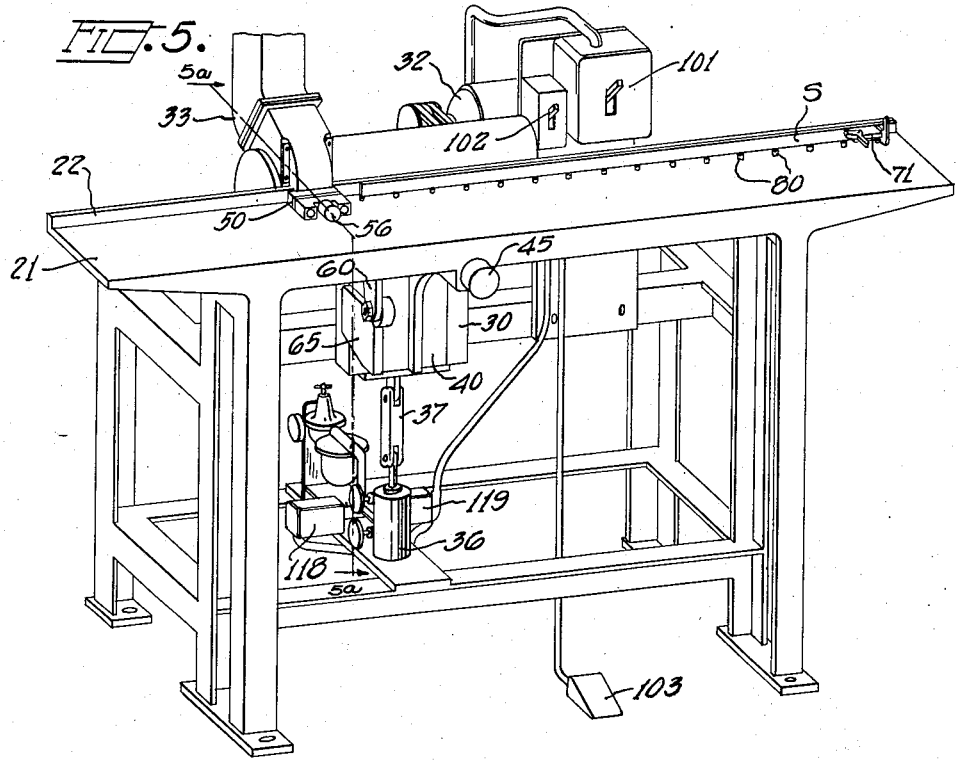
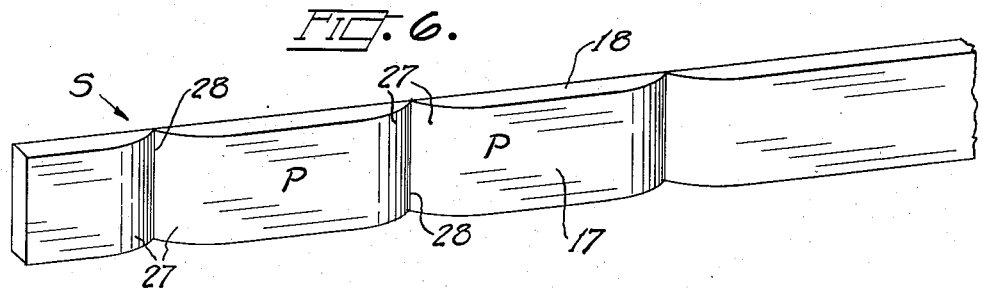
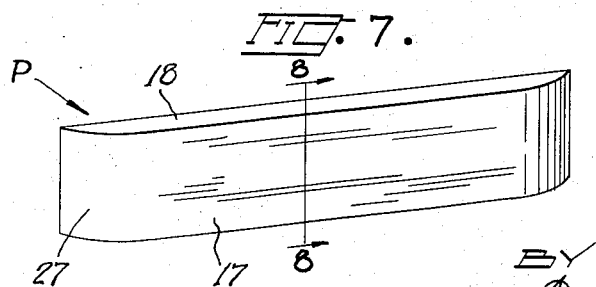
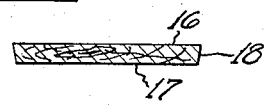
INVENTORS
ELBERT V. BENNETT
HARRELL RENN
BY
Cook and Schermerhorn
ATTORNEYS

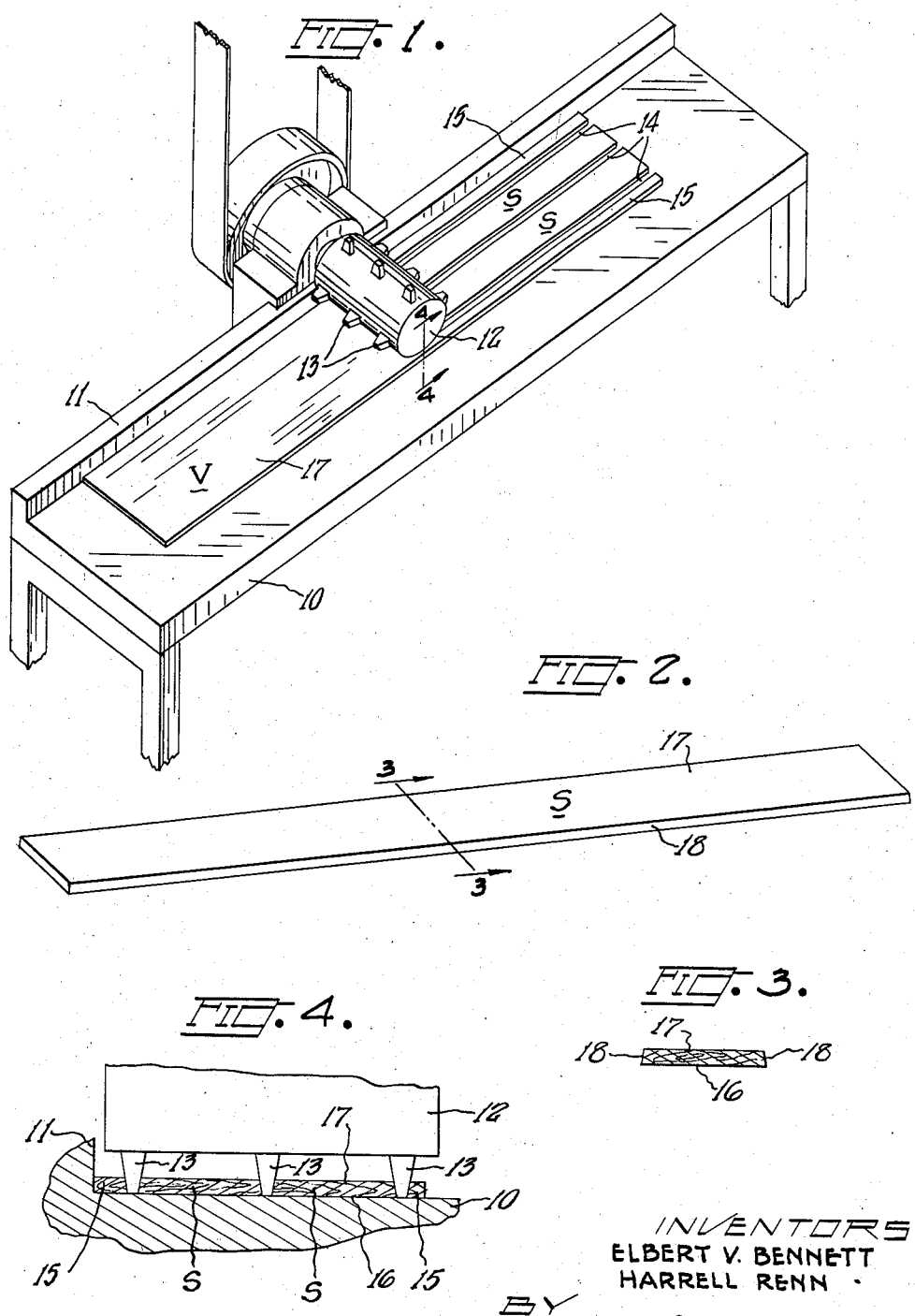

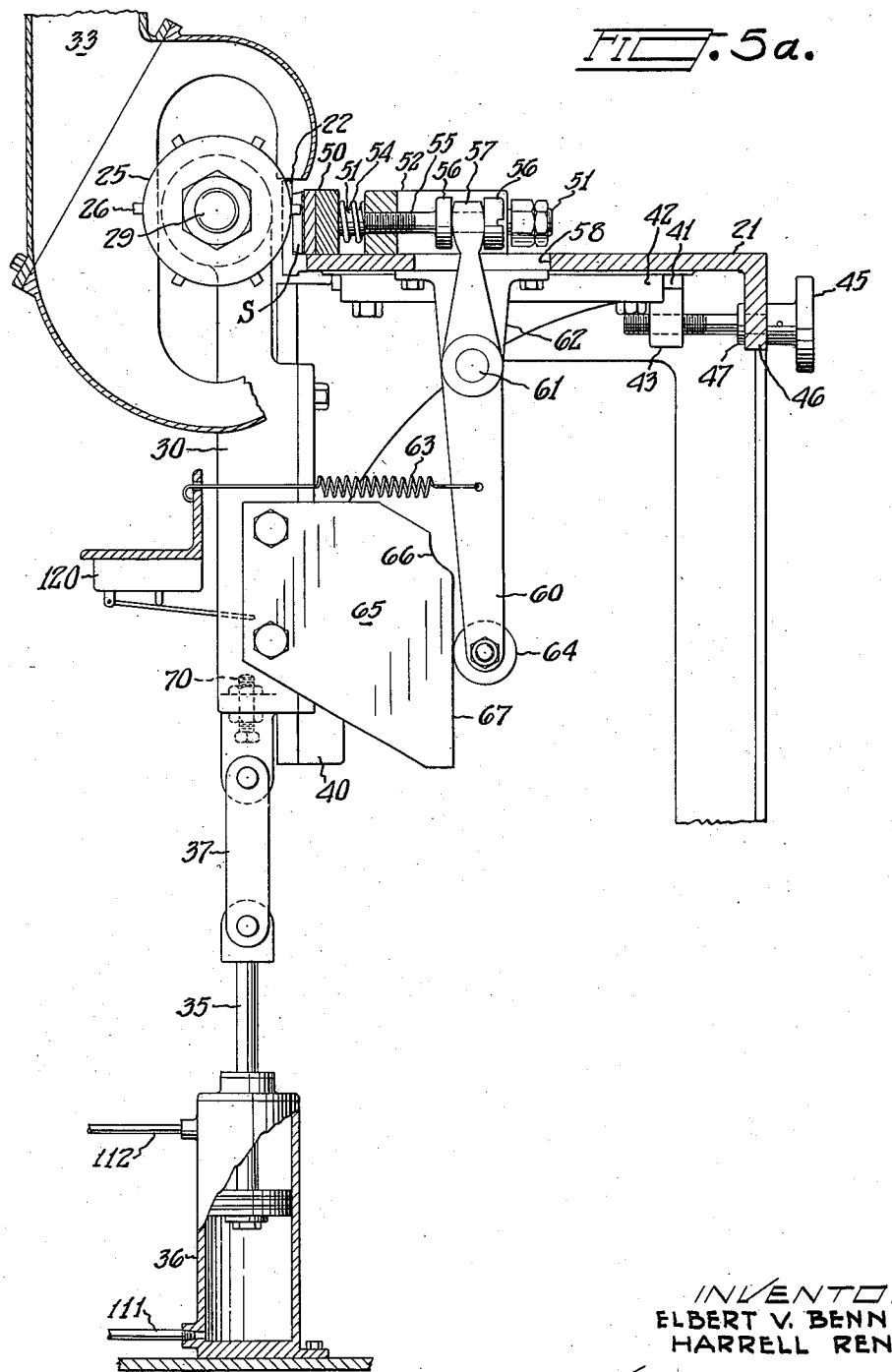

Aug. 25, 1953   E. V. BENNETT ET AL   2,649,869
APPARATUS FOR MAKING WOOD PATCHES
Filed Aug. 29, 1950   5 Sheets-Sheet 4
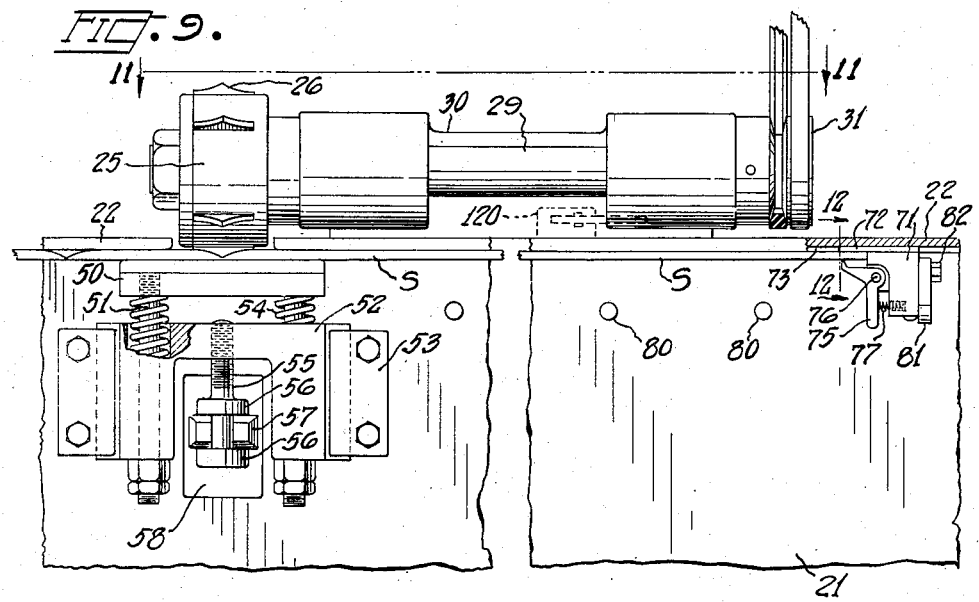
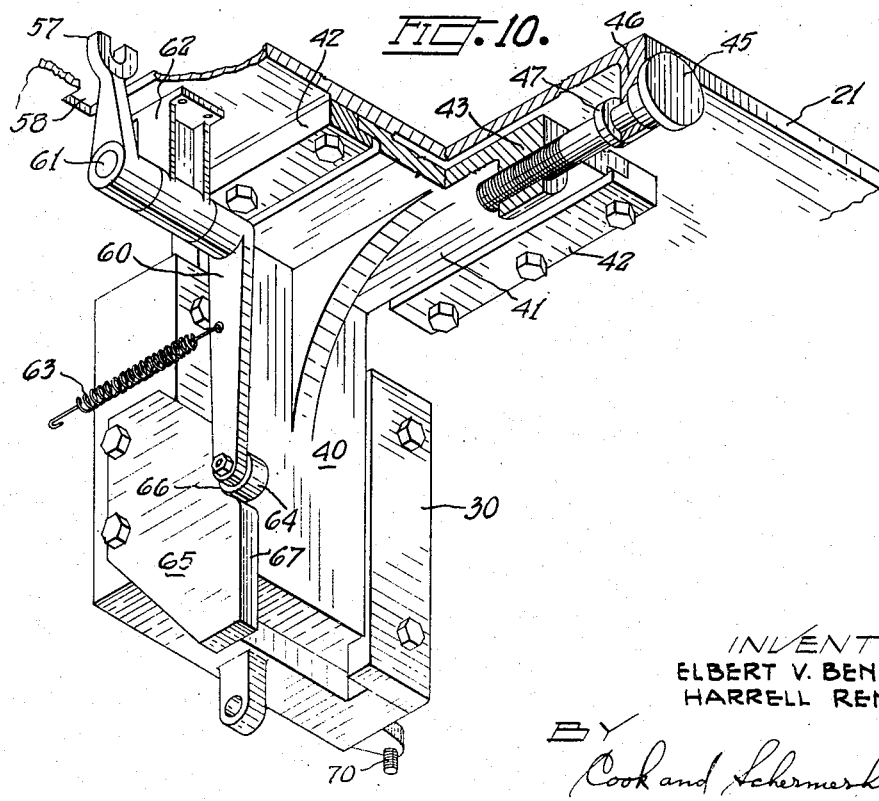
INVENTORS
ELBERT V. BENNETT
HARRELL REHN
BY
Cook and Schermerhorn
ATTORNEYS

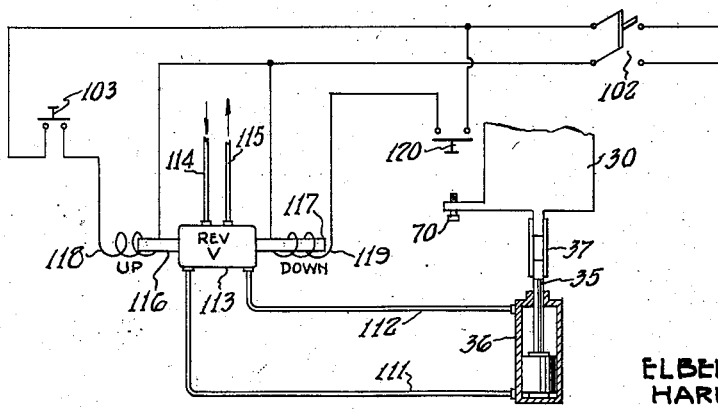

Patented Aug. 25, 1953

2,649,869

UNITED STATES PATENT OFFICE 2,649,869

APPARATUS FOR MAKING WOOD PATCHES

Elbert V. Bennett and Harrell Renn, Albany, Oreg., assignors to M and M Wood Working Company, Portland, Oreg., a corporation of Oregon Application August 29, 1950, Serial No. 181,983

12 Claims. (Cl. 144—2)

This invention relates to apparatus for making wood veneer repair patches.

It is the practice to improve the grade of veneer, plywood, or lumber by routing out small knots, pitch pockets, and other defects and applying a patch of clear grained wood veneer in the prepared recess to cover the defect. Various forms of patches have heretofore been devised for this purpose such as circular, boat-shaped, or elongated patches with rounded ends, all of which have a number of disadvantages. They are wasteful of the high grade patch veneer, they are not well suited for quantity production, they are not conveniently adaptable to the patching of defects of different sizes, they leave much to be desired in the quality of the bond obtained at the ends of the patch, and they require rather complicated patch making equipment having delicate adjustments to make the patch fit properly.

Objects of the present invention are, therefore, to provide apparatus for making an improved form of patch which overcomes the shortcomings and disadvantages enumerated above. Particular objects are to provide apparatus for making patches of a shape to reduce waste of the patching veneer, to make a style of patch having a stronger bond with the surrounding wood, to make patches of different sizes which do not require different patch making, routing and gluing equipment, and to provide relatively inexpensive but accurate machinery for making the patches in large quantity.

In general, the invention comprises novel and improved apparatus for making a rectangular sled patch having the improved characteristics hereinabove pointed out. The present apparatus is designed to effect a novel method of production making a supply of the patches in long strips from which the individual patches may be broken off as they are needed. Pieces of the patch veneer are first cut into such strips having a width equal to the desired width of the patch. By the use of the special tools and equipment to be presently described, the tapered sled-shaped ends of the patches are formed on one side of the strip without cutting through the strip to separate the patches. Certain functions of the machine are performed automatically to simplify and reduce the number of manual operations required of the operator.

The patch strips are preferably of uniform width, but the individual patches may be made to different standard lengths by simple manipulation of the machine without changing the shaping tool or making any other time consuming changes or adjustments in the equipment. The rectangular shape of the patches greatly simplifies the cutting tools and simplifies the problem of maintaining the precision necessary for a good fit of the patch in a machine prepared recess.

The invention is described in detail in the following specification in connection with the accompanying drawings which illustrate preferred embodiments of the apparatus, and additional objects and advantages will become apparent to persons skilled in the art. Various changes may be made, however, in the construction and arrangement of parts, and certain features may be used without others without departing from the spirit of the invention as defined in the appended claims. It is, therefore, to be understood that the drawings are intended merely to illustrate the principles of the invention and are not intended to limit the invention.

In the drawings:

Figure 1 is a perspective view of a machine for cutting patch strips;

Figure 2 is a perspective view of a patch strip;

Figure 3 is a cross sectional view taken on the line 3—3 of Figure 2;

Figure 4 is a fragmentary sectional view taken on the line 4—4 of Figure 1;

Figure 5 is a perspective view of a machine for forming individual patches on the patch strips:

Figure 5a is a cross sectional view, with certain parts omitted, taken on the line 5a—5a of Figure 5;

Figure 6 is a perspective view of a patch strip after the patches have been formed;

Figure 7 is a perspective view of an individual patch;

Figure 8 is a cross sectional view taken on the line 8—8 of Figure 7;

Figure 9 is a fragmentary plan view of a portion of the machine shown in Figure 5;

Figure 10 is a perspective view of the cutting tool adjustment mechanism in the machine of Figure 5 viewed from below;

Figure 11 is a rear elevation view of the vertical tool slide taken on the line 11—11 of Figure 9;

Figure 12 is a fragmentary sectional view of the strip feed and grip device taken on the line 12—12 of Figure 9;

Figure 13 is a partially exploded view in perspective of the strip feed and grip device shown in Figure 12; and Figure 14 is a schematic diagram of the electrical and fluid pressure systems in the machine shown in Figure 5.

In Figure 1, the table 10 has a back flange or fence 11 to guide the longitudinal movement of a sheet of patch veneer V relative to a rotary milling cutter 12. The cutter 12 is equipped with three sets of tapered cutting blades 13 which cut tapered slots 14 to form a pair of patch strips S and trim off waste strips 15. The taper of the blades 13 makes the bottom surfaces 16 of the strips wider than the top surfaces 17 and leaves the edges 18 inclined to the top and bottom surfaces as shown in Figures 3 and 4. In the ultimate patches, the wide under surface 16 forms the top of the patch. The patch strip cutter of Figure 1 may, obviously, be designed to cut a larger number of strips S simultaneously, but in the present case it is intended to utilize relatively narrow scraps of clear grained veneer.

Figure 5 is a general view of a shaping machine for transversely grooving the narrow surface 17 of the strip S in Figure 2 to form the strip of connected patches shown in Figure 6. The machine has a table top 21 to support a strip S on edge for longitudinal feed movement against a vertical guide plate or fence 22 extending along the rear side of the machine and is equipped with a rotary shaper tool 25 having V-shaped cutter blades 26 as shown in Figure 9 to form sled-shaped end surfaces 27 on the series of patches P. In the present illustration the end surfaces 27 are circular arcs tangent to the bottom surfaces 17 of the patches. The machine is preferably adjusted so that the peaks of the blades do not break through the opposite surface of the strip, whereby the patches P remain joined together in end to end relation by thin webs or necks of material 28 on the top surface 16 of the patches.

The cutter 25 is mounted on a shaft 29 journaled in suitable bearings on a vertical tool slide 30, as best shown in Figure 11. Shaft 29 is driven by pulleys 31 belted to a motor 32 which is also mounted on the slide 30. Slide 30 is raised and lowered by a piston rod 35 connected with a piston in a fluid pressure cylinder 36. A link 37 pivotally connects the slide with the piston rod to accommodate misalignment between the slide and the cylinder. The numeral 33 designates a suction hood to remove cuttings.

Slide 30 is mounted on a vertical guide bracket 40 which has a horizontal top portion 41 constituting a slide in a pair of horizontal guides 42 on the underside of table 21 as shown in Figure 10. The vertical guide bracket 40 is also equipped with a tapped boss 43 to receive the threaded end of an adjusting screw 45 which is accessible at the front of the table. Screw 45 is rotatably mounted in a depending flange or bracket 46 on the table 21 and is equipped with a collar 47 to cooperate with the knob 48 in preventing longitudinal movement of the screw. Thus, as adjusting screw 45 is turned in one direction or the other, the vertical guide bracket 40 is moved forward or back under the table to adjust the cutter 25 relative to fence 22 for accurately controlling the depth of cut.

The strip S is held firmly against fence 22 during a cutting operation by means of a releasable clamp shoe 50 shown in Figure 9. Shoe 50 is carried by a pair of studs 51 in a slide 52 mounted in guides 53 on top of the table 21 directly opposite the cutter 25. Springs 54 urge the clamp shoe 50 toward the fence 22. Slide block 52 is retracted in its guides 53 by means of a stud 55 having flanges 56 engaging opposite sides of a shifter fork 57, which projects up through an opening 58 in the table top. Fork 57 is connected with a downwardly extending lever 60 by means of a short shaft 61 journaled in a bracket 62 on the underside of the table. Lever 60 is connected with a tension spring 63 which acts through the fork 57 tending to pull the clamp shoe 50 away from the work.

The lower end of lever arm 60 carries a roller 64 to ride on a cam plate 65 attached to the vertical slide 30. When the slide is in its lower position, as shown in Figure 10, roller 64 engages a relieved portion 66 of the cam, allowing spring 63 to hold the clamp shoe 50 in retracted position to permit feed movement of the work. As soon as slide 30 starts upward, roller 64 rides upon the raised portion 67 of the cam, swinging lever arm 60 and fork 57 in a counterclockwise direction to release clamp shoe 50 to hold the work piece firmly against fence 22 under the action of springs 54. Slide 30 is also equipped with an adjustable switch actuating screw 70.

Referring now more particularly to Figures 12 and 13, the numeral 71 designates a sliding strip feed device for moving the strip S to indexed positions for treatment by the cutter 25. The feed device has a slide tongue 72 fitting in a groove or way 73 in the front face of fence plate 22 for travel along this plate, the front face of slide tongue 72 being flush with the front face of plate 22 to engage one end of a strip S in the manner shown. A lever 75 is pivotally mounted on pin 76 and urged by spring 77 into clamping engagement with a strip S to clamp the end of the strip against slide tongue 72, as best shown in Figure 9. The feed device is indexed to different working positions by a series of stop studs 80 spaced at regular intervals along the table 21. An upstanding lever 81 is pivotally mounted on screw 82 in a convenient position to be grasped by the right hand of the operator. When the feed device 71 is advanced with the lever 81 in its upright position as shown in Figure 12, the lever will engage the next stop 80 to index the strip S at a working position. By swinging lever 81 in a counterclockwise direction after the cutting operation is completed at a particular station, the lower end of the lever will clear the stop to allow the feed device to be moved to the next stop. The stops 80 may be located to cut one particular length of patch, as, for instance, at four-inch intervals to cut four-inch patches, or they may be located at two-inch intervals to allow the operator to cut four-, six-, and eight-inch patches without any further adjustment by merely skipping one or two stops in each feed movement. In any event, it is apparent that the table top 21 may be provided with a series of holes to receive stops 80 in any positions the operator may desire.

Semiautomatic control mechanism is provided for raising and lowering the cutter 25 for each operation on the work piece, the cutter remaining in lowered position at the completion of each operation to clear the work piece so that the work piece may be advanced by the feed indexing device 71. In Figure 5 the numeral 101 designates a manual control switch for the cutter motor 32 which runs continuously, and numeral 102 designates a main control switch for the automatic mechanism. A cycle of tool traverse movements is initiated by foot switch 103.

Referring now to Figure 14, the bottom and top ends of cylinder 36 are connected by pipes 111 and 112 with a solenoid-operated reversing valve 113. The reversing valve 113 is also connected with a fluid pressure supply pipe 114 and an exhaust or relief pipe 115. The pressure and relief connections for the opposite ends of cylinder 36 are reversed by means of a balanced sliding spool valve having magnetic armatures 116 and 117 extending from opposite sides of the valve housing. When "up" solenoid 118 is energized, armature 116 is pulled to the left to place the valve in its "up" position, and when "down" solenoid 119 is energized, armature 117 is pulled to the right to place the valve in its "down" position. Solenoid 118 is controlled by foot switch 103 which is spring returned to open position when foot pressure is removed. Solenoid 119 is controlled by a normally spring opened switch 120 which is closed momentarily by the screw 70 in the upward movement of the vertical tool slide 30. When both switches 103 and 120 are open, the valve 113 remains in the position of its last actuation.

The rest position of the parts is illustrated in Figures 10 and 14. Slide 30 is in its lowermost position which carries tool 25 below the level of work piece S and allows cam follower 64 to rest in the relieved portion 66 of cam 65 so that spring 63 holds the clamp 50 retracted. Feed device 71 may then be moved to the left in Figures 5 and 9 to index the strip S to the next cutting position. Both solenoids 118 and 119 are deenergized and the movable valve member connected between armatures 116 and 117 is in its right-hand position after the completion of the previous operation. In this position, designated as the "down" position, fluid pressure from supply pipe 114 is admitted into top cylinder pipe 112, and bottom cylinder pipe 111 is connected with the exhaust or relief pipe 115. Both of switches 103 and 120 are open.

When the operator closes foot switch 103 momentarily, solenoid 118 is energized to pull armature 116 to the left and move the valve member to its "up" position, admitting pressure to pipe 111 and connecting pipe 112 to exhaust. The piston then moves slide 30 and tool 25 upward transversely across the patch strip S to cut a V-shaped groove which forms the curved surfaces 27 previously referred to. As slide 30 starts upward, the raised surface 67 of cam 65 rides under roller 64 to rock fork 57 toward the work piece and allow clamp 50 to hold the work piece firmly against back plate 22 for the cutting operation.

The upward movement of tool 25 is terminated as shown in Figure 11 by the engagement of screw 70 with switch 120 to close the switch and energize the "down" solenoid 119. With the energization of this solenoid, armature 117 and the movable valve member are pulled back to the right to admit pressure to the top of the cylinder through pipe 112 and exhaust through the bottom pipe 11. The piston travels down to its lower limit of movement carrying the tool 25 clear of the work piece and dropping cam roller 64 back into the relieved part of the cam 65 to retract the work clamp 50. The feed device 71 may then be advanced to the selected stop for the next cutting operation.

The depth of cut is adjusted by means of screw 45. The cut may be made deep enough to cut the patches apart, if desired, but it is preferred to leave them attached in strip form by thin webs of connecting material at the break lines 28. This not only allows the patches to be handled conveniently in strip form, but also has a further important advantage. In order to present predominantly flat grain, rather than end grain, on the curved surfaces 27, the ends become so thin they are likely to develop a feather edge which may not be square across the patch, and which, in any event, is likely to chip and split. It is essential that the patch have clean-cut square ends in order to fit the recess or pocket prepared for it in the piece of wood which is being repaired, and this may best be accomplished by adjusting the tool by means of screw 45 to leave the patches connected by the thin webs 28. Then, when the patches are broken apart by hand, there is no tendency to splinter or split the wood, even though the web portions 28 are so thin that they are not perceptible on the ends of the patches after they are broken apart. Thus, for all practical purposes, the circular arc of the curved surface 27 may be considered to intersect the plane of the top surface 16 of the patch, and the ends of the patch are not caused to project noticeably above the top surface of the wood being repaired. In any event, the patches are ordinarily sanded after they have been glued in place to make them perfectly smooth with the surface of the wood.

When the patches are left connected in strip form as shown in Figure 6, they are in convenient form for automatic magazine feed having a power operated feed device to perform the function of manual feed device 71 for advancing one strip at a time in step by step longitudinal movement.

By providing a supply of patches of different lengths, pitch seams and cracks of any length can be repaired with a single patch, instead of following the conventional practice of overlapping a series of small patches in end to end relation which produces an unsightly repair. With the present type of patch, a long repair is considerably less conspicuous than a short repair, because the side edges are usually invisible after sanding and the ends are not easily noticed as they get farther apart.

By making patches of the same width for long and short repairs, the same routing tool may be used for preparing the wood to receive patches of different size, and also the same heat and pressure applying tool may be used for setting the glue on the patches.

The shaping tool 25 may have its blades ground to make any contour desired in the sled ends of the patch, but the apparatus of the invention has particular utility for making patches to fit prepared recesses cut by a rotary routing tool on a horizontal shaft. In routing out a defect in the wood to be repaired, the rotary tool is traversed in the plane of its rotation to make a shallow elongated recess with upwardly sloping cylindrical end surfaces having a radius of curvature equal to the radius of the routing tool. To fit such a prepared recess the patch must have its end surfaces 27 cylindrical and tangent to bottom surface 17. This is the shape of each side of the V-shaped groove formed in the patch strip by blades 26 in Figures 9 and 11, but the invention is not to be limited to any particular shape of blade.

Having now described our invention and in what manner the same may be used, what we claim as new and desire to protect by Letters Patent is:

1. In a veneer patch cutting machine, a table for supporting a strip of wood veneer in fixed position, a rotary tool having V-shaped cutting blades for cutting a transverse groove in said strip, a slide carrying said tool for traverse movement across said strip, a guide for said slide, means for reciprocating said slide in said guide to traverse the tool between working and non-working positions, and means for adjusting said guide toward and away from said strip to vary the depth of cut.

2. A machine for cutting wood veneer patches comprising a guide plate for positioning one face of a veneer strip, means to clamp a strip against said guide plate, a rotary cutting tool mounted for reciprocating traverse movement across said face between working and non-working positions, means to adjust said tool toward and away from said guide plate to vary the depth of cut, V-shaped cutting blades on said tool to cut a V-shaped groove across said strip when the tool is traversed, and means to index the strip in different working positions in longitudinal feed movement.

3. A wood veneer patch cutting machine comprising a plate for positioning one face of a strip of veneer in a definite plane, means for clamping a veneer strip against said plate, a rotary cutter mounted for reciprocating traverse movement across said veneer face to working and rest positions and equipped with V-shaped blades to groove said face, and means responsive to the traverse movement of said cutter to release said clamping means when the cutter is in rest position and to actuate said clamping means when the cutter is in working position.

4. In a wood veneer patch cutting machine, a table for holding a veneer strip in working position, a rotary cutter having V-shaped cutting blades mounted for traverse movement across said strip to shape the ends on adjacent patches simultaneously in a single cutting operation, a guide supporting said cutter for sliding traverse movement between working and non-working positions, fluid pressure operated means for traversing said cutter in said guide, and means for adjusting said guide toward and away from the veneer strip.

5. In a wood veneer patch cutting machine, a table for supporting a strip of veneer, a feed slide on said table, a clamp on said slide to grip one end of the veneer strip, a series of stops on said table in the path of said slide, and a stop engaging lever on said slide movable to a release position to enable manual feed movement past said stops.

6. In a wood veneer patch cutting machine, a table for supporting a veneer strip, a rotary tool having V-shaped cutting elements mounted for traverse across one face of said veneer strip to cut a wide V-shaped groove in said face forming sled-shaped ends on adjacent patches in said strip, a feed slide, a clamp on said feed slide to grip the veneer strip, a series of stops in the path of said feed slide, and means on said feed slide to engage said stops to enable manual indexing of the veneer strip to different working positions with respect to said tool to make patches of a length equal to an integer multiple of the distance between said stops.

7. In a wood veneer patch cutting machine, a table for positioning a veneer strip in working position, a rotary cutter having V-shaped cutting blades mounted for traverse movement across said veneer strip to shape the ends of adjacent patches being formed from said strip, fluid pressure operated means for traversing said cutter between working and non-working positions, a reversing valve for controlling the direction of movement of said fluid pressure operated means, manual means to operate said valve to move the cutter from non-working to working position, and means actuated by the movement of said cutter to working position to operate said reversing valve to return the cutter to non-working position.

8. A wood veneer patch cutting machine comprising a table for holding a strip of veneer in working position, a rotary tool having V-shaped cutting blades mounted on a slide for cutting transverse grooves in said strip, a guide for said slide, means for adjusting said guide toward and away from said strip of veneer, means for traversing said slide and tool between working and non-working positions, means for clamping said veneer strip against the table, and means actuated by said slide to release said clamping means when the tool is in non-working position and to clamp said clamping means when the tool is in working position.

9. A veneer patch cutting machine comprising a table for holding a piece of veneer in working position, means for clamping the veneer in said position, means for indexing longitudinal feed movement of the veneer, a rotary tool mounted on a slide for traverse movement across said veneer, fluid pressure operated means for traversing said slide, symmetrical V-shaped cutting elements on said tool for shaping opposite ends of adjacent patches simultaneously in a single working stroke of the tool, a guide for said slide, means for adjusting said guide toward and away from said veneer to vary the depth of cut, and means operated by said slide to control said clamping means.

10. A veneer patch cutting machine comprising a table having a vertical fence for engaging a flat face of a strip of veneer supported on edge on the table, means for clamping the strip against said fence, a rotary cutting tool having blades operable through said fence on said face of the veneer, a vertical guide and slide supporting said tool for vertical traverse movement across said face of the veneer, means for adjusting said guide horizontally relative to said fence to vary the depth of cut of said tool, and means actuated by said slide to control said clamping means.

11. In a veneer patch cutting machine and the like, a table having means for engaging a flat face of a strip of veneer to support said face in a predetermined position, means for clamping the strip against said first means, a rotary cutting tool having blades operable on said face of the veneer, a guide and slide supporting said tool for traverse movement across said face of the veneer, means for adjusting said guide relative to said strip engaging means to vary the depth of cut of the tool, means actuated by said slide to control said clamping means, a fluid pressure operated unit mounted in a fixed position relative to said table and strip engaging means to traverse the tool, and a link pivotally connected between said unit and said slide to accommodate misalignment between said unit and slide resulting from operation of said adjusting means.

12. A veneer patch cutting machine comprising a table having a vertical fence for engaging a flat face of a strip of veneer supported on edge on the table, means for clamping the strip against said fence, a rotary cutting tool having blades operable through said fence on said face of the veneer, a vertical guide and slide supporting said tool for vertical traverse movement across said face of the veneer, means for adjusting said guide horizontally relative to said fence to vary the depth of cut of said tool, means actuated by said slide to control said clamping means, a fluid pressure operated traverse unit mounted on said table in a fixed position relative to said fence, and a link pivotally connected between said unit and said slide to accommodate misalignment between said unit and slide resulting from operation of said adjusting means.

ELBERT V. BENNETT.
     HARRELL RENN.

References Cited in the file of this patent

UNITED STATES PATENTS

| Number | Name | Date |
|---|---|---|
| 109,005 | Hall | Nov. 8, 1870 |
| 157,473 | Hutchins | Dec. 8, 1874 |
| 345,668 | Buss | July 20, 1886 |
| 481,983 | Thom | Sept. 6, 1892 |
| 529,505 | Overhiser | Nov. 20, 1894 |
| 829,463 | Dunbar | Aug. 28, 1906 |
| 1,092,518 | Brooks | Apr. 7, 1914 |
| 1,510,008 | Lumb | Sept. 30, 1924 |
| 1,968,840 | Linn | Aug. 7, 1934 |
| 1,981,231 | Grant | Nov. 20, 1934 |

FOREIGN PATENTS

| Number | Country | Date |
|---|---|---|
| 12,469 | Great Britain | of 1849 |